United States Patent [19]

Yonekawa et al.

[11] 3,962,020
[45] June 8, 1976

[54] TIRE BEAD FLIPPING APPARATUS

[75] Inventors: Hisashi Yonekawa; Tosio Azuma, both of Higashimurayama, Japan

[73] Assignee: Bridgestone Tire Company Limited, Tokyo, Japan

[22] Filed: Dec. 23, 1974

[21] Appl. No.: 535,852

[30] Foreign Application Priority Data
Dec. 28, 1973  Japan.................................. 49-2646

[52] U.S. Cl. ............................................... 156/460
[51] Int. Cl.² .......................................... B29H 17/34
[58] Field of Search ........... 156/460, 422, 517, 353, 156/405 P, 136

[56] References Cited
UNITED STATES PATENTS

| | | | |
|---|---|---|---|
| 1,428,420 | 9/1922 | De Mattia | 156/405 P |
| 1,479,126 | 1/1924 | Butler | 156/460 |
| 1,827,674 | 10/1931 | Shively | 156/460 |
| 1,871,119 | 8/1932 | Denmire | 156/460 |
| 2,702,579 | 2/1955 | Perry | 156/405 P |
| 2,748,833 | 6/1956 | Monroe et al | 156/517 X |
| 2,855,976 | 10/1958 | Jeannero et al. | 156/460 |
| 3,142,603 | 7/1964 | Parshall et al. | 156/517 X |
| 3,192,094 | 6/1965 | Phillips et al. | 156/405 P |
| 3,291,674 | 12/1966 | Worrall, Jr. et al. | 156/353 |
| 3,532,578 | 10/1970 | Chronister | 156/422 |
| 3,787,263 | 1/1974 | Yonekawa et al. | 156/422 |

FOREIGN PATENTS OR APPLICATIONS

| | | | |
|---|---|---|---|
| 831,649 | 6/1938 | France | 156/422 |
| 271,167 | 5/1927 | United Kingdom | 156/422 |

*Primary Examiner*—Douglas J. Drummond
*Assistant Examiner*—John E. Kittle
*Attorney, Agent, or Firm*—Haseltine, Lake & Waters

[57] ABSTRACT

A tire bead flipping apparatus where a flipper cloth is gradually folded around a tire bead in a manner to remove internal stress from the flipper cloth which would otherwise be developed therein due to dimensional discrepancy between the inner and outer diameters of the tire bead, by cooperation of various moving components which are positioned inside and outside the tire bead.

6 Claims, 7 Drawing Figures

(a)　　　　　(b)

TIRE BEAD FLIPPING APPARATUS

This invention relates to a tire bead flipping apparatus, and more particularly to an apparatus for applying a flipper cloth around a vehicle tire bead which has circumferentially adhered therewith an anchoring rubber strip of triangular cross-section.

An apparatus for covering with a flipper cloth a vehicle tire bead circumferentially having a triangular anchoring rubber strip (the tire bead as applied with an anchor strip will be hereafter referred to simply as "tire bead" for brevity) is known, wherein a tire bead having on its outer circumference an anchoring rubber strip of the afore-mentioned cross-section is placed on a flipper cloth which is wound around an inflatable air bag. After placing the tire bead on the air bag, the latter is inflated to press the flipper cloth tightly from inside against the inner periphery of the tire bead, folding the flipper cloth coveringly around the bead. In this instance, the flipper cloth is folded at one time over the entire circumference of the tire bead so that the outer edges of the folded flipper cloth tend to deflex or bend to one side of the tire and contract in radial directions. This is because internal stress is developed in the flipper cloth due to the dimensional discrepancy between the inner and outer diameters of the tire bead. The greater the discrepancy, the greater the tendency of the flipper cloth to bend or contract in radial directions. As a result, a difficulty is encountered in embedding the flipped bead in a correct position on a tire casing in the flat band form and the deflexed flipper cloth edges contribute to impair the function of the bead and therefore to deteriorate the quality and performance of the vehicle tire to be producted.

It is an object of the present invention to provide a tire bead flipping apparatus which will eliminate the difficulty mentioned above.

It is a more particular object of the invention to provide a tire bead flipping apparatus which is capable of covering a tire bead with a flipping cloth without causing deflections thereto to ensure correct positioning of the bead in the tire casing.

It is a further object of the invention to provide a tire bead flipping apparatus which can contribute to the improvement of quality and performance of vehicle tires.

According to the present invention, the aforementioned objects are achieved by an apparatus which comprises: first, second and third guide rollers having circumferential grooves and mounted on the inner side of a tire bead for rotation about axes which are disposed parallel to the rotational axis of the tire bead, at least one of the first to third guide rollers being rotatingly driven for revolving the tire bead under guidance; at least two tire bead push rollers rotatable on the inner side of the tire bead opposingly to the guide rollers about axes which are disposed parallel to the rotational axis of the tire bead and movable toward and away from the tire bead; a pair of inner and outer pressing guide members positioned on the inner and outer sides of the tire bead and movable toward and away from each other for transferring the flipper cloth together with and in pressed contact with the inner periphery of the tire bead at a position between the first guide roller and the tire bead push rollers; a flipper cloth guide roller rotatable about an axis parallel to the rotational axis of the tire bead for guiding a web of flipper cloth to be fed to the pressing guide members at a position between the tire bead push rollers; a pair of flipper cloth folding members movable toward and away from the tire bead at a position between the second and third guide rollers for folding the flipper cloth on opposite sides of the tire bead, each of the flipper cloth folding members being in the form of a curved blade having its sides disposed substantially in parallel to the inner and outer peripheries of the tire bead at an end opposing the second guide roller and in parallel to the sides of the tire bead at the other end opposing the third guide roller; a pair of flipper cloth pressing rollers rotatable about axes which are disposed perpendicular to the rotational axis of the tire bead and movable toward and away from the third guide roller, each of the flipper cloth pressing rollers having a truncated cone shape tapered toward the third guide roller and adapted to be pressed against the circumferential surface of the third guide roller by the action of a spring; a flipper cloth detection mechanism mounted on the outer side of the tire bead opposingly to one of the pressing guide members and movable toward and away from the tire bead; and a cutting mechanism having a cutting blade adapted to run across the inner pressing guide member for severing the flipper cloth.

The above and other object, features and advantages of the present invention will become clear from the following particular description and the appended claims, taken in conjunction with the accompanying drawings which show by way of example only a preferred embodiment of the present invention.

Figure 1:
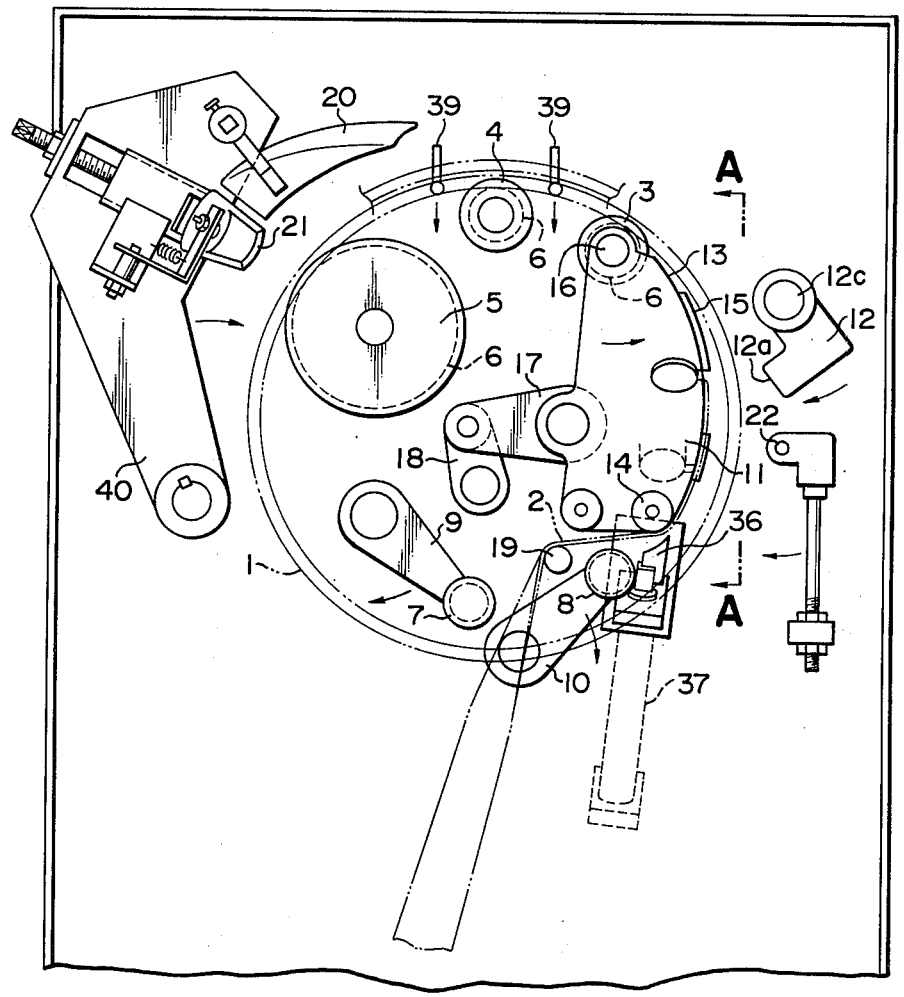
FIG. 1 is a diagrammatic front view of the tire bead flipping apparatus embodying the present invention.
Figure 2:
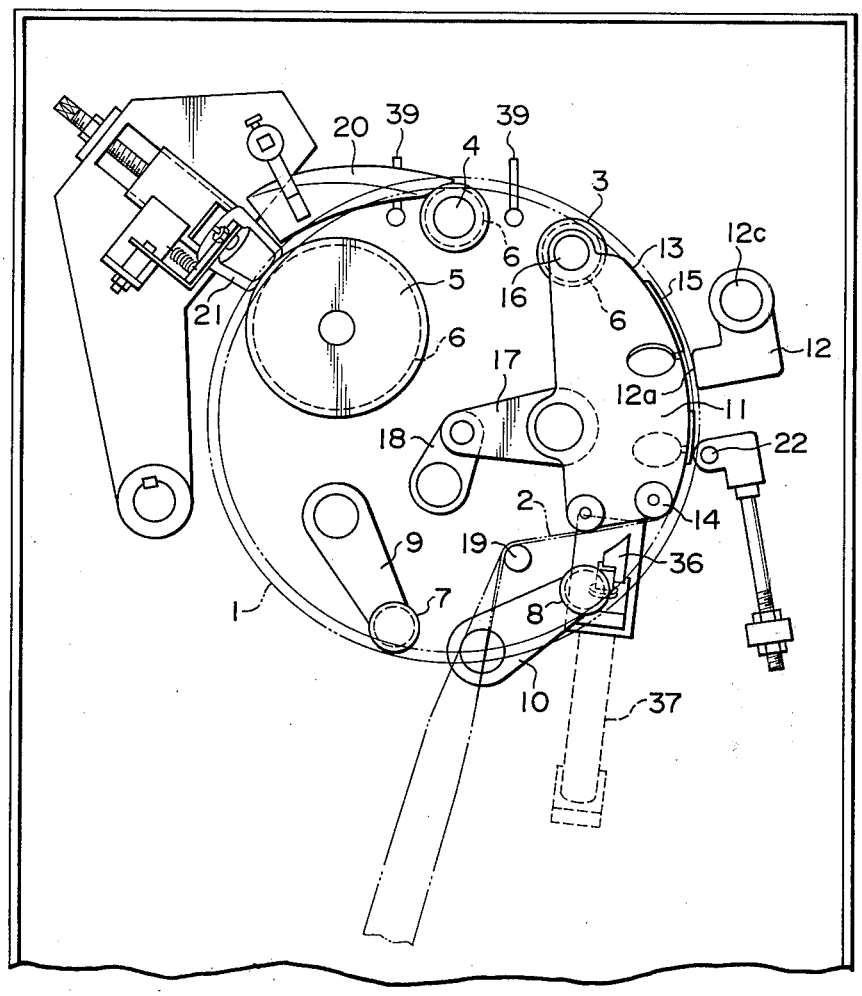
FIG. 2 is a view similar to FIG. 1 but showing the apparatus in a different phase of operation.
Figure 3:
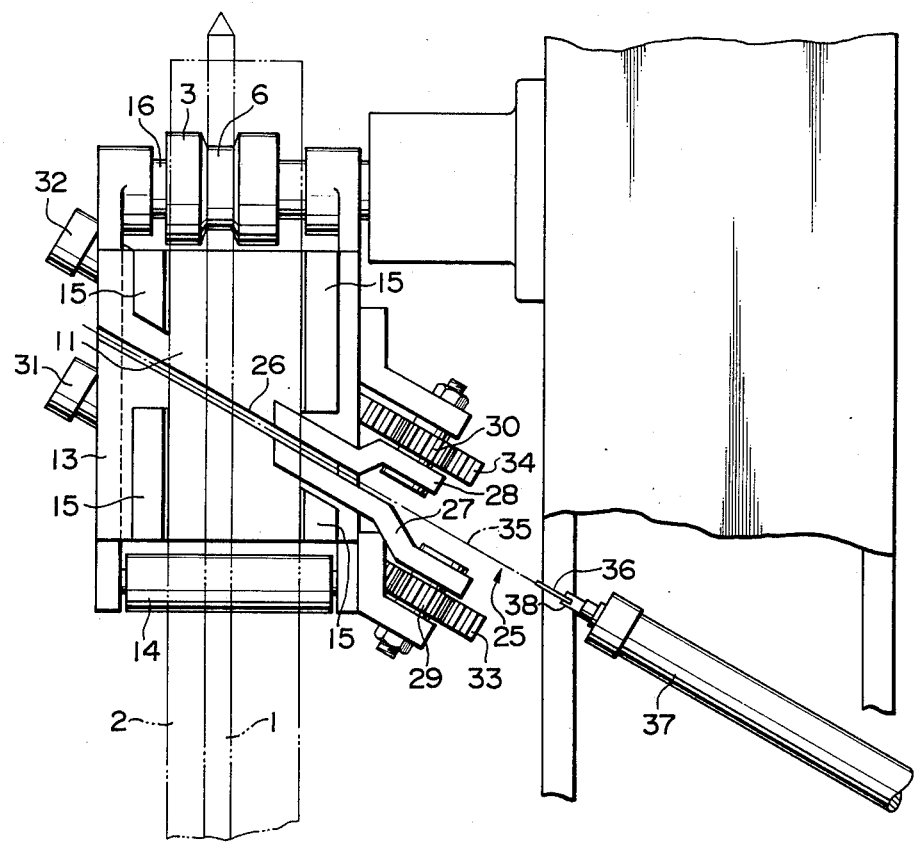
FIG. 3 is an enlarged sectional view as seen in the direction of arrows A — A of FIG. 1.
Figure 5:
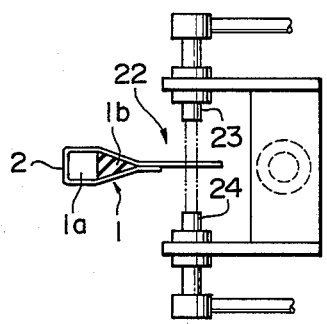
FIG. 5 is a sectional view taken along line B — B of FIG. 4.
Figure 4:
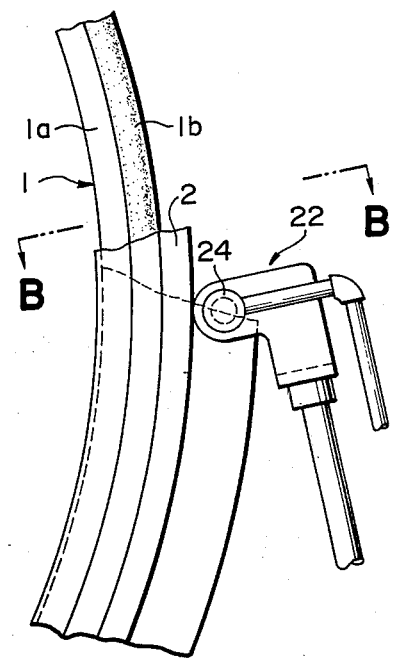
FIG. 4 is an enlarged side view of a flipper cloth detection mechanism.
Figure 6:
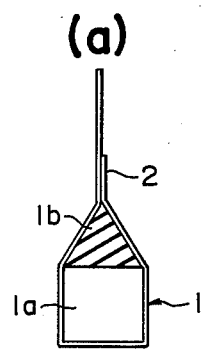
FIGS. 6a and 6b are diagrammatic sectional views showing tire beads with or without an anchoring rubber strip as covered in a flipper cloth.
Figure 6:
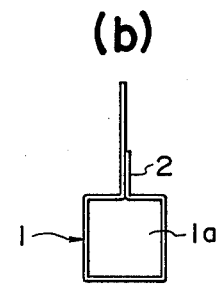

Referring now to the accompanying drawings and first to FIGS. 1 and 2, designated at 1 is a tire bead which has a circular bead 1a and an anchoring rubber strip 1b of triangular cross-section which is adhered around the circumference of the bead 1a as shown more particularly in FIG. 6a. The bead 1a and the anchoring rubber strip 1b are covered with a flipper cloth 2. In this connection, it should be noted that the present invention is applicable also to a tire bead which is not provided with an anchoring rubber strip as shown in FIG. 6b. The tire bead flipping apparatus of the present invention includes a first, second and third guide rollers 3 to 5 for rotatably supporting thereon a tire bead 1. The first to third guide rollers 3 to 5 are rotatable about their own axes which are disposed in parallel to the rotational axis of the tire bead 1 as seen in FIGS. 1 and 2. In the particular embodiment shown, the second and third guide rollers 4 and 5 are positively driven, while the first guide roller 3 is of the idler type. The guide rollers 3 to 5 are formed respectively with a circumferential groove 6 for rotatingly guide the bead 1 therealong during their rotation. In the present invention, suitable guidance of the tire bead 1 can be attained if at least one of the guide rollers 3 to 5 is positively driven. Designated at 7 and 8 are tire bead push rollers which are employed for pushing the tire bead 1 from inside and are rotatable about their own axes which are disposed parallel to the rotational axis of the tire bead 1. It is preferred to provide at least two tire bead push rollers opposingly to the guide rollers 3 to 5. The push rollers 7 and 8 are rotatably mounted on arms 9 and 10, respectively, which are rockable for moving the push rollers 7 and 8 toward and away from the tire bead 1. A pair of pressing guide members 11 and 12 are positioned opposingly on the inner and outer sides of the tire bead 1 between the guide roller 3 and the tire bead push roller 8 for guiding the flipper cloth 2 on and along the tire bead 1. The inner pressing guide member 11 has an arcuate guide surface 13 of a curvature substantially same as that of the inner periphery of the tire bead 1 and is provided with an idling roller 14 at the lower end through which the flipper cloth 2 is introduced and with a plurality guide plates 15 which are located along the opposite side edges of the curved guide surface 13 for holding the flipper cloth 2 against the inner periphery of the tire bead 1, as shown in FIG. 3. The pressing guide member 11 is rotatably supported at its upper end on the rotational axis 16 of the first guide roller 3. In this instance, the inner pressing guide member 11 is imparted with rocking movement about the axis 16 at a predetermined timing by a suitable driving means, not shown, through links 17 and 18. The outer pressing guide member 12 generally has an angular shape and has at one end a curved surface 12a to snugly fit on the outer periphery of the tire bead 1, the other end being pivotally supported on a shaft 12c. In the particular embodiment shown, the inner and outer pressing guide members 11 and 12 are adapted to rotate toward and away from each other. However, if desired, they may be adapted to move straight toward and away from the tire bead 1 without involving rotational movement. The flipper cloth 2 is introduced onto the guide surface 13 of the inner pressing guide member 11 by way of a flipper cloth guide roller 19 which is located between the tire bead push rollers 7 and 8 and between the push rollers 7 and 8 and the inner pressing guide member 11 for rotation about its own axis which is disposed parallel to the rotational axis of the tire bead 1. Indicated at 20 are a pair of flipper cloth folding members which are mounted on a rocking arm 40 for movement toward and away from the tire bead 1 for folding from opposite sides the flipper cloth 2 about the tire bead 1 in positions between the second and third guide rollers 4 and 5. The flipper cloth folding members 20 are each in the form of a curved or twisted blade having its sides disposed in parallel to the sides of the tire bead 1 at the rear end opposing the third guide roller 5 and in parallel to the inner and outer peripheries of the tire bead 1 at the fore or free end opposing the second guide roller 4. The fore free ends of the paired flipper cloth folding members 20 opposing the second guide roller 4 are to be inserted under the flipper cloth 2 to fold the same on the opposite sides of the tire bead 1 gradually as it is rotated with the latter. Designated at 21 are a pair of flipper cloth pressing rollers each mounted on the arm 40 for rotation about its own axis which is disposed perpendicular to the rotational axis of the tire bead 1. The flipper cloth pressing rollers 21 are movable toward and away from the circumferential surface of the third guide roller 5 and have a truncated cone shape tapering toward the third guide roller 5. A flipper cloth detection means 22 is mounted opposingly to the pressing guide member 11 for movement toward and away from the tire bead 1. In the particular embodiment shown, the flipper cloth detection means 22 consists of, as shown particularly in FIGS. 4 and 5, a light projector 23 and a photoelectric unit 24 which are located on opposite sides of the passage of the outermost circumferential side edges of the folded flipper cloth 2. The flipper cloth detection means 22 may be provided in a form other than the combination of a light projector and a photoelectric tube as shown in the drawings, for example, it may be of the type which utilizes a fluid flow, direct contact with the cloth, or light reflections.

Referring now to FIG. 3, there is shown at 25 a cutter mechanism which is adapted to cut the flipper cloth 2 travelling along the arcuate guide surface 13 of the inner pressing guide member 11. The cutter mechanism 25 includes a slit 26 which is formed obliquely across the inner pressing guide member 11. A pair of rotatable flipper cloth holding plates 27 and 28 are provided for holding the flipper cloth 2 from outside and on opposite sides of the slit 26 in a small gap relation with each other. The flipper cloth holders 27 and 28 are rotatingly driven into the respective holding positions by means of pinion gears 29 and 30 which are in meshing engagement with racks 33 and 34 on piston rods (not shown) of fluid operated cylinders 29 and 30, respectively. The flipper cloth 2 is severed by a cutting blade 36 which is adapted to run along line 35 through the gap between the flipper cloth holders 27 and 28 and through the slit 26. In the particular embodiment shown, the cutting blade 36 is mounted at a fore end of a piston rod 38 of a fluid operated cylinder device 37.

Referring again to FIG. 1, indicated at 39 are stoppers which have hooked lower ends and are movable in a vertical direction for lifting or lowering a tire bead 1 from or onto the guide rollers 3 to 5.

In operation, the tire bead 1 is covered with the flipper cloth 2 by the apparatus of the invention in the manner as will be discussed hereafter.

In the first stage as shown in FIG. 1, the tire bead push rollers 7 and 8 are held in raised positions, while the inner and outer pressing guide members 11 and 12 are kept away from each other and the detection mechanism 22 is moved in a position most distant from the inner pressing guide member 11. The flipper cloth folding members 20 and the flipper cloth pressing rollers 21 are moved into the respective upper rest positions shown, while raising the stoppers 39. Then, a web of flipper cloth 2 is fed from a flipper cloth feeding device (not shown) to the flipper cloth guide roller 19 through one side of the tire bead 1 between the tire bead push rollers 7 and 8, up to slightly over the slit 26 on the curved guide surface 13 of the inner pressing guide member 11. At this time, the fluid operated cylinder 31 is actuated to hold the flipper cloth 2 securely against the curved guide surface 13 of the inner pressing guide member 11 by means of the cloth holding plate 27, the flipper cloth 2 being positioned between the guide plates 15 which are provided along the opposite longitudinal side edges of the inner pressing guide member 11.

In the second stage, a tire bead 1 is hooked on the stoppers 39 and, in the third stage, the stoppers 39 are lowered to place the tire bead 1 in the circumferential grooves 6 of the first to third guide rollers 3 to 5, followed by lowering of the tire bead push rollers 7 and 8 to push the tire bead 1 from inside. In the fourth stage, the flipper cloth folding members 20 are lowered into flipper cloth folding positions on opposite sides of the tire bead 1, and at the same time the flipper cloth pressing rollers 21 are moved toward the circumferential surface of the third guide roller 5. There follows the fifth stage where the inner and outer pressing guide members 11 and 12 are moved toward each other to hold the flipper cloth 2 and the tire bead 1 therebetween, pressing the flipper cloth 2 against the inner periphery of the tire bead 1 and then the flipper cloth holding plate 27 is swung away into a disengaged rest position by actuating the fluid operated cylinder 31. In the sixth stage, the inner and outer pressing guide members 11 and 12 are moved away from each other. At this time, there is no posibility of the flipper cloth 2 being drooped down at its upper end since it is securely pressed against the inner periphery of the tire bead 1. In the seventh stage, the detection mechanism 22 is moved into a position adjacent to the outer periphery of the tire bead 1, followed by rotation of the second and third guide rollers 4 and 5, whereupon the flipper cloth 2 which has been partially folded in the circumferential grooves 6 of the first and second guide rollers 3 and 4 is further folded gradually and tightly pressed against the opposite sides of the tire bead 1 by the flipper cloth folding members 20. The outer edges of the flipper cloth 2 which has been folded around the tire bead 1 are pressed to each other by the flipper cloth pressing rollers 21 to completely cover the tire bead 1. In this manner according to the present invention, the flipper cloth 2 is folded inch by inch around the tire bead 1 to gradually cover the same, so that the rubber material covering the flipper cloth 2 undergoes plastic deformation little by little to remove the internal stress of the flipper cloth 2. Therefore, the outer margins of the folded flipper cloth 2 would not deflect or contract in the radial direction.

When the fore end of the flipper cloth 2 folded around and covering the tire bead 1 is rotated through the tire bead push rollers 7 and 8 into a position within an operating range of the detector 22, the second and third guide rollers 4 and 5 are stopped by a signal from the detector 22. In this instance, the flipper cloth 2 slightly overruns due to inertia of rotating mechanical parts. In the succeeding eighth stage, the fluid cylinders 31 and 32 as shown in FIG. 3 are actuated to rotate the flipper cloth holding plates 27 and 28 into the respective holding positions to press the flipper cloth 2 against the inner pressing guide member 11. Under these circumstances, the fluid operated cylinder 37 is actuated to plunge the cutting blade 36 along the line 35 between the flipper cloth holding plates 27 and 28 to sever obliquely the flipper cloth 2. Thereafter, the fluid operated cylinder 32 is operated to rotatingly disengage the holding plate 28 from that side of the flipper cloth 2 which is coveringly folded around the tire bead 1.

In the nineth stage, the second and third guide rollers 4 and 5 are rotated again to cover the tire bead 1 completely with the flipper cloth 2, followed by the tenth stage where the flipper cloth folding members 20, flipper cloth pressing rollers 21 and detector 22 are retreated into the respective rest positions away from the tire bead 1. In the eleventh stage, the tire bead push rollers 7 and 8 are moved upwardly into their rest positions away from the tire bead 1, and the stoppers 39 are raised to remove from the first to third guide rollers 3 to 5 the tire bead 1 which has been covered with the flipper cloth 2 for discharging the same out of the machine of the invention.

The operations thus far discussed herein constitute one cycle of the tire bead flipping machine of the invention and the same cycle is repeated to flip a number of tire bead in a continuous manner.

The foregoing description illustrates the tire bead 1 as being hooked on the stoppers 39, however, the tire bead 1 may be directly placed in the circumferential grooves 6 of the first to third guide rollers 3 to 5 without providing the stoppers 39, if desired. It is preferred that the circumferential grooves 6 of the first to third guide rollers 3 to 5 have an adjustable width to allow adaptation to tire beads of different widths. The circumferential grooves 6 of the first to third guide rollers 3 to 5 should preferably be differed for each other in sectional configuration or depth in such a manner as to cover the tire bead 1 optimumly without causing dragging to the flipper cloth 2.

It will be understood from the foregoing description that, according to the present invention, the flipper cloth is folded around the tire bead without deflection or bending in the marginal skirt portions so that the flipped tire bead may be easily placed in a predetermined position in the tire casing, contributing to enhance the quality and function of the tire.

What is claimed is:

1. A tire bead flipping apparatus comprising:
   first, second and third guide rollers having circumferential grooves and mounted on the inner side of a tire bead for rotation about axes which are disposed parallel to the rotational axis of said tire bead, at least one of said first to third guide rollers being rotatingly driven for revolving said tire bead under guidance;
   at least two tire bead push rollers rotatable on the inner side of said tire bead opposingly to said guide rollers about axes which are disposed parallel to the rotational axis of said tire bead and movable toward and away from said tire bead;
   a pair of inner and outer pressing guide members positioned on the inner and outer sides of said tire bead and movable toward and away from each other for transferring said flipper cloth together with and in pressed contact with the inner periphery of said tire bead at a position between said first guide roller and said tire bead push rollers, said inner pressing guide member being provided with an arcuate guide surface of a curvature same as that of the inner periphery of said tire bead; a flipper cloth guide roller rotatable about an axis parallel to the rotational axis of said tire bead for guiding a web of flipper cloth to be fed to said pressing guide members at a position between said tire bead rollers;
   a pair of flipper cloth folding members movable toward and away from said tire bead at a position between said second and third guide rollers for folding said flipper cloth on opposite sides of said tire bead, each of said flipper cloth folding members being in the form of a curved blade having its sides disposed substantially in parallel to the inner and outer peripheries of said tire bead at an end opposing said second guide roller and in parallel to the sides of said tire bead at the other end opposing said third guide roller;

a pair of flipper cloth pressing rollers rotatable about axes which are disposed perpendicular to the rotational axis of said tire bead and movable toward and away from said third guide roller, each of said flipper cloth pressing rollers having a truncated cone shape tapered toward said third guide roller and adapted to resiliently be pressed against the circumferential surface of said third guide roller by the action of a spring;

a flipper cloth detection mechanism mounted on the outer side of said tire bead opposingly to one of said pressing guide members and movable toward and away from said tire bead for detecting the leading end of said flipper cloth to produce a signal for stopping said one of said first to third guide rollers;

a cutting mechanism including a slit formed obliquely across said inner pressing guide member and a cutting blade adapted to run along said slit for severing said flipper cloth; and flipper cloth holding means including a pair of flipping cloth holders movable toward and away from said arcuate guide surface of said inner pressing guide member for holding said flipper cloth on said inner pressing guide member at opposite sides of said slit.

2. The tire bead flipping apparatus as set forth in claim 1, wherein said inner pressing guide member is provided with a plurality of guide plates along longitudinal side edges of said arcuate guide surface.

3. The tire bead flipping apparatus as set forth in claim 1, said outer pressing guide member has a curved guide surface at a tire bead pressing end thereof.

4. The tire bead flipping apparatus as set forth in claim 1, wherein said flipper cloth detection mechanism includes a light projector and a photoelectric tube respectively movable into position on opposite sides of a passage of folded outer edges of said flipper cloth.

5. The tire bead flipping apparatus as set forth in claim 1, further comprising a pair of stop members movable toward and away and mounted on opposite sides of said second guide roller for automatically lowering and lifting said tire bead into and from said circumferential grooves of said first to third guide rollers.

6. The tire bead flipping apparatus as set forth in claim 1, wherein said flipper cloth folding members and said flipper cloth pressing rollers are mounted on a common rocking arm.

* * * * *